United States Patent
Adam et al.

Patent Number: 5,554,738
Date of Patent: Sep. 10, 1996

[54] ACYL-ARYL DISAZO HAVING A 6-UREIDO-1-HYDROXY-NAPHTHALENE-3-SULFONIC ACID COUPLING COMPONENT

[75] Inventors: Jean-Marie Adam, Rosenau, France; Adolf Käser, Bottmingen, Switzerland

[73] Assignee: Ciba-Geigy Corporation, Tarrytown, N.Y.

[21] Appl. No.: 781,634

[22] Filed: Oct. 18, 1991

Related U.S. Application Data

[63] Continuation of Ser. No. 492,247, Mar. 9, 1990, abandoned, which is a continuation of Ser. No. 182,612, Apr. 18, 1988, abandoned.

[30] Foreign Application Priority Data

Apr. 27, 1987 [CH] Switzerland ............... 1594/87

[51] Int. Cl.$^6$ .................................. C09B 31/08
[52] U.S. Cl. .......................... 534/829; 534/797
[58] Field of Search .................... 534/797, 829

[56] References Cited

U.S. PATENT DOCUMENTS

| | | | |
|---|---|---|---|
| 1,757,496 | 5/1930 | Baddilry et al. | 537/829 X |
| 2,026,920 | 1/1936 | Taube et al. | 534/829 |
| 3,539,626 | 11/1970 | Gagneux | 564/48 X |
| 4,083,840 | 4/1978 | Schoefberger | 534/797 |

FOREIGN PATENT DOCUMENTS

| | | | |
|---|---|---|---|
| 2302326 | 9/1976 | France | 534/829 |
| 1644214 | 12/1970 | Germany | 534/829 |
| 2616856 | 4/1975 | Germany | 534/797 |
| 80-151072 | 11/1980 | Japan | 534/829 |
| 1909-4768 | of 1910 | United Kingdom | 534/829 |
| 277756 | 9/1927 | United Kingdom | 534/829 |
| 1176898 | 1/1970 | United Kingdom | 534/829 |

OTHER PUBLICATIONS

Colour Index, 3rd Edition, volume 4, pp. 4256, 4261 and 4262, Nos. 28/20, 28370, 28390, 28400 (1971).

*Primary Examiner*—Fiona T. Powers
*Attorney, Agent, or Firm*—Kevin T. Mansfield; Marla J. Mathias

[57] ABSTRACT

Anionic disazo dyes useful for dyeing and printing textile materials, paper and leather and for the preparation of inks of the formula

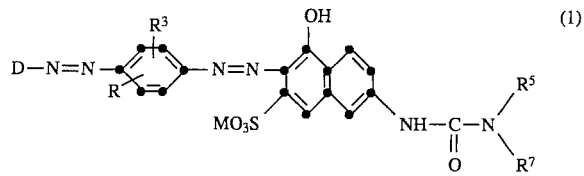

wherein D, $R^3$, $R^4$, M, $R^5$ and $R^7$ are defined as in the specification.

5 Claims, No Drawings

ACYL-ARYL DISAZO HAVING A 6-UREIDO-1-HYDROXY-NAPHTHALENE-3-SULFONIC ACID COUPLING COMPONENT

This is a continuation of Ser. No. 07/492,247, filed Mar. 9, 1990, now abandoned, which in turn is a continuation of Ser. No. 07/182,612, filed Apr. 18, 1988, now abandoned.

The present invention relates to anionic disazo dyes of formula

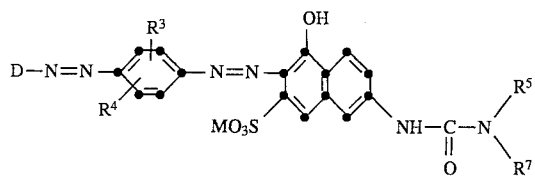

wherein

D is a radical of formula

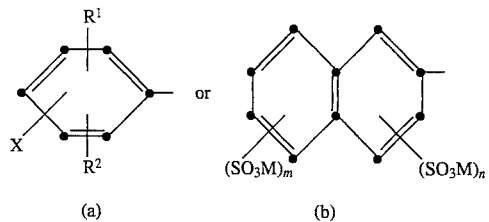

X is —COOM or —SO$_3$M $R^1$ and $R^2$ are each independently of the other hydrogen, $C_1$-$C_4$ alkyl or $C_1$-$C_4$ alkoxy, m is 0, 1 or 2, n is 0 or 1, and m+n are 1 or 2, with the proviso that two sulfo groups present in the same ring may not be in ortho-position to each other, $R^3$ is hydrogen, $C_1$-$C_4$ alkyl or $C_1$-$C_4$ alkoxy, $R^4$ is hydrogen or $C_1$-$C_4$ alkyl, with the proviso that the two substituents $R^3$ and $R^4$ are in para-position to each other if they have a meaning different from hydrogen, $R^5$ is hydrogen, $C_1$-$C_4$ alkyl or a radical

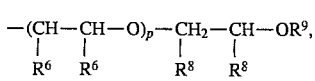

$R^6$ and $R^8$ are each independently of the other hydrogen or $C_1$-$C_2$ alkyl, with the proviso that one substituent $R^6$ and one substituent $R^8$ must be hydrogen, $R^7$ is hydrogen, $C_5$-$C_7$ cycloalkyl, $C_1$-$C_6$ alkyl which is unsubstituted or substituted by amino, $C_1$-$C_4$ alkylamino or $C_1$-$C_4$ dialkylamino, a radical of formula

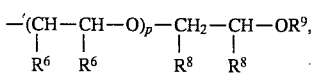

or a radial of formula —A—Y, $R^9$ is hydrogen or $C_1$-$C_4$ alkyl,

A is the direct bond or a straight chain or branched $C_1$-$C_6$ alkylene radical, Y is phenyl or naphthyl, each unsubstituted or substituted by sulfo, carboxy, halogen, $C_1$-$C_4$ alkyl, $C_1$-$C_4$ alkoxy, $C_1$-$C_4$ alkoxycarbonyl or $C_1$-$C_4$ hydroxyalkoxycarbonyl, or $R^5$ and $R^7$, together with the linking nitrogen atom, are a pyrrolidine, piperidine or morpholine radical or a piperazine radical which is unsubstituted or substituted by $C_1$-$C_4$ alkyl, $C_1$-$C_4$ hydroxyalkyl or $C_1$-$C_4$ aminoalkyl at the nitrogen atom which is not attached to the triazine ring, p and q are each independently of the other 0 or a whole number not greater than 3, and M is hydrogen or the equivalent of a colourless cation.

X in the radical of formula (a) is preferably the sulfo group.

$R^1$ and $R^2$ as alkyl are, for example, methyl, ethyl, n-propyl, isopropyl, n-butyl or tert-butyl. $R^1$ and $R^2$ as alkoxy are, for example, methoxy, ethoxy, or butoxy.

$R^1$ is preferably hydrogen, methyl, methoxy or ethoxy, in particular hydrogen, methyl or methoxy and, most preferably, hydrogen or methyl.

$R^2$ is preferably hydrogen or methyl and, most preferably, hydrogen.

If $R^1$ and $R^2$ are hydrogen, the substituent X may be in ortho-, meta- or para-position to the azo group.

If the radical of formula (a) contains a further substituent in addition to the substituent X, then X and $R^1$ or $R^2$ are preferably in meta-position to each other, i.e. preferably in positions 2 and 4 to the azo group. The substituent X is also preferably in 3-, 5- or 4-position to the azo group and $R^1$ or $R^3$ is in ortho- or para-position to the substituent X, i.e. X and $R^1$ or $R^2$ are preferably in 2,5- or 3,4-position to the azo group.

If the radical of formula (a) contains two further substituents in addition to the substituent X, then X is preferably in position 4 or 5 and the two substituents $R^1$ and $R^2$ are in positions 2,5 and 2,4 respectively to the azo group.

If D is a radical of formula (b), then two sulfo groups present in the same ring cannot be in ortho-position to each other. A sulfo group present in the radical of formula (b) is, for example, in positions 5, 6, 7 or 8, preferably in positions 5 and 6. If the radical of formula (b) is substituted by two sulfo groups, these are, for example, in positions 3,6, 3,7, 4,8, 5,7 or 6,8, preferably in positions 3,6, 4,8 and 6,8.

D is preferably a radical of formula (a).

Alkyl or alkoxy groups $R^3$ and/or $R^4$ are, for example, the groups cited for $R^1$ and $R^2$. Preferably $R^3$ and $R^4$ are each independently of the other hydrogen, methyl, methoxy or ethoxy and, most preferably, are each hydrogen. $R^5$ is preferably methyl, ethyl, —CH$_2$—CH$_2$—OH or, most preferably, hydrogen.

$R^6$, $R^8$ and $R^9$ are preferably each independently of one another methyl or, most preferably, hydrogen.

p and q are each preferably 1 and, most preferably, 0.

$R^5$ and $R^7$, together with the linking nitrogen atom, can also form a piperidine, morpholine or piperazine radical. The piperazine radical can be substituted by $C_1$-$C_4$ alkyl, $C_1$-$C_4$ hydroxyalkyl or $C_1$-$C_4$ aminoalkyl at the nitrogen atom which is not attached to the triazine ring. The preferred substituent is hydroxyethyl.

The preferred meanings of $R^7$ are methyl, ethyl, hydroxyethyl, aminoethyl, each unsubstituted or mono- or dialkylated at the N-atom by $C_1$-$C_4$ alkyl, or a group of formula —$(CH_2—CH_2—O)_p—CH_2—CH_2—OH$, where p is 0 or 1, or a group —A—Y, in which A and Y are as defined for formula (1).

A as a straight chain or branched $C_1$-$C_6$ alkylene radical is, for example, methylene, ethylene, ethylidene, propylene, trimethylene, ethylethylene, 1-methyl-1,3-trimethylene. The preferred meaning of A is methylene or ethylene. Of particular interest, however, are the compounds of formula (1),

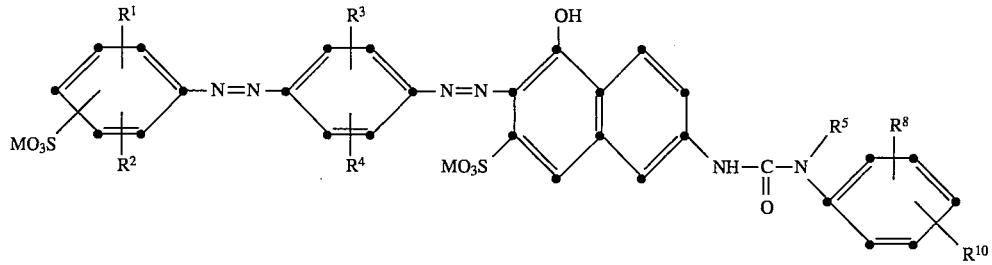

wherein A is the direct bond, i.e. those in which the phenyl or naphthyl radical is attached direct to the N-atom.

Examples of suitable substituents of the phenyl and naphthyl radical are sulfo, carboxy, methyl, ethyl, methoxy, ethoxy, chlorine, methoxycarbonyl, ethoxycarbonyl or hydroxyethoxycarbonyl.

Preferably Y is a naphthyl radical which carries one or two sulfo groups, or is a phenyl radical which is unsubstituted or substituted by sulfo, carboxy, chlorine, methyl, methoxy, ethoxy, ethoxycarbonyl or hydroxyethoxycarbonyl.

Particularly preferred compounds of formula (1) are those in which Y is an unsubstituted phenyl radical or a phenyl radical which is substituted by sulfo or carboxy.

M is hydrogen or the equivalent of a colourless anion, for example, lithium, sodium, potassium, ammonium or the protonated form of a $C_4$-$C_{12}$ trialkylamine, $C_4$-$C_{12}$ diamine or $C_2$-$C_{12}$ alkanolamine.

M as a protonated $C_4$-$C_{12}$ trialkylamine may be, for example, protonated N-ethyldimethylamine, N,N-diethylmethylamine, tri-n-propylamine, tri-n-butylamine, triisobutylamine and, in particular, triethylamine or triisopropylamine. Mixtures of different protonated amines are also suitable.

M as a protonated $C_4$-$C_{12}$ diamine is, for example, an ethylenediamine or 1,3-diaminopropane in which one or both N-atoms are additionally substituted by one or two $C_1$-$C_4$ alkyl radicals, preferably by methyl or ethyl groups. M is in this case preferably a N,N-dialkylethylenediamine or N,N-dialkyl-1,3-diaminopropane, for example, N-ethylethylenediamine, N,N-dimethylethylenediamine, N,N'-dimethylethylenediamine, N,N-diethylethylenediamine, 3-dimethylamino-1-propylamine or 3-diethylamino-1-propylamine.

M as a protonated $C_2$-$C_{12}$ alkanolamine may be, for example, the protonated form of a monoalkanolamine, dialkanolamine, monoalkanolmonoalkylamine, monoalkanoldialkylamine, dialkanolalkylamine or trialkanolamine, or a mixture of different protonated alkanolamines. Examples are protonated 2-aminoethanol, bis(2-hydroxyethyl)amine, N-(2-hydroxyethyl)methylamine, N-(2-hydroxyethyl)dimethylamine, N-(2-hydroxyethyl)diethylamine, N-N-bis(2-hydroxyethyl)methylamine, N,N-bis(2-hydroxyethyl)ethylamine or tris(2-hydroxyethyl)amine, 2-(2-aminoethoxy)ethanol or diethylaminopropanol.

The preferred meaning of M is $N^\oplus$, $Li^\oplus$ or protonated $C_4$-$C_6$ alkanolamine, tris(2-hydroxyethyl)amine, bis(2-hydroxyethyl)amine or a mixture of these two amines being the preferred $C_4$-$C_6$ alkanolamines.

A particularly preferred embodiment of the invention comprises the disazo dyes of formula

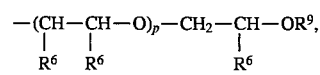

wherein $R^1$ and $R^2$ are each independently of the other hydrogen, $C_1$-$C_4$ alkyl or $C_1$-$C_4$ alkoxy, $R^3$ is hydrogen, $C_1$-$C_4$ alkyl or $C_1$-$C_4$ alkoxy, $R^4$ is hydrogen or $C_1$-$C_4$ alkyl, with the proviso that the two substituents $R^3$ and $R^4$ are in para-position to each other if they have a meaning different from hydrogen, $R^5$ is hydrogen, methyl, ethyl or a radical $$-(CH—CH—O)_p—CH_2—CH—OR^9,$$
$$\phantom{-(}R^6\phantom{H—}R^6\phantom{O)_p—CH_2—}R^6$$

$R^6$ is hydrogen or $C_1$-$C_2$ alkyl, $R^8$ is hydrogen, sulfo or carboxy, $R^9$ is hydrogen or $C_1$-$C_4$ alkyl, $R^{10}$ is hydrogen, sulfo, carboxy, chlorine, methoxy, ethoxy, ethoxycarbonyl or hydroxyethoxycarbonyl, $p$ is 0 or 1, and M is hydrogen or the equivalent of a colourless cation.

Among these compounds, those compounds are especially preferred in which $R^1$ is hydrogen, methyl or methoxy, $R^2$ is hydrogen or methyl, $R^3$ and $R^4$ are each independently of the other hydrogen, methyl, methoxy or ethoxy, $R^5$ is hydrogen or hydroxyethyl, $R^8$ is hydrogen, sulfo or carboxy, $R^9$ and $R^{10}$ are each hydrogen and M is $Na^\oplus$, $Li^\oplus$ or protonated $C_4$-$C_6$ alkanolamine.

The disazo dyes of formula (1) are prepared in a manner known per se, for example by reacting a compound of formula

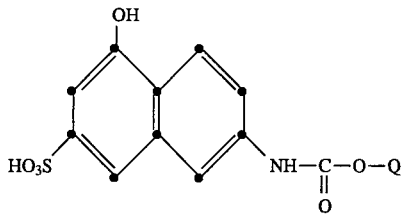

wherein Q is an unsubstituted or substituted phenyl or alkyl radical, with an amine of formula

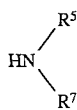 (4)

with either the compound of formula (3) or the reaction product of the compound (3) and the amine of formula (4) being coupled with a diazotised amine of formula

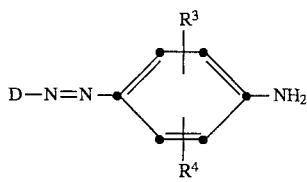 (5)

in which formulae (4) and (5) above the substituents $R^5$, $R^7$, D, $R^3$ and $R^4$ are as defined for formula (1).

The disazo dyes of formula (1) can also be prepared by reacting I-acid (7-amino-4-hydroxy-2-naphthalenesulfonic acid) with an isocyanate of formula $$OCN-A-Y' \quad (6)$$

to give a compound of formula

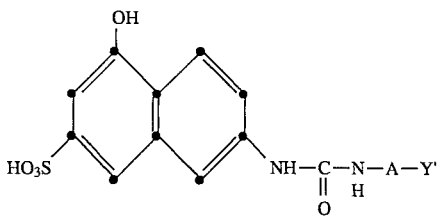 (7)

and coupling said compound of formula (7) to a diazotised amine of formula (5), in which formulae above Y' is phenyl or naphthyl, each unsubstituted or substituted by sulfo, halogen, $C_1$-$C_4$ alkyl, $C_1$-$C_4$ alkoxy or $C_1$-$C_4$ alkoxycarbonyl.

A further means of preparing the disazo dyes of formula (1) comprises first coupling I-acid with a diazotised amine of formula (5) and then acylating the reaction product with an isocyanate of formula (6).

It is preferred first to couple a compound of formula (3) with a diazotised amine of formula (5) and then to react the resultant disazo compound with an amine of formula (4), which reactions are carried out without isolation of the intermediates, or to react I-acid with an isocyanate of formula (6) and then to react the reaction product with an amine of formula (5).

The compounds of formulae (3), (4), (5) and (6) are known or can be prepared in known manner.

The coupling reaction is also carried out in a manner known per se, for example in the temperature range from 0° to 75° C., preferably from 0° to 35° C., and at a pH in the range from 5 to 9.

The reaction of the compound of formula (3), or of the disazo compound obtained from the compound of formula (3) and the diazotised amine of formula (5) with an amine of formula (4), is likewise carried out in a manner known per se, for example in the temperature range from 30° to 100° C. in aqueous solution and in the pH range from 7 to 9.

The reaction of I-acid, or of the coupling product of I-acid and a diazotised amine of formula (5), with an isocyanate of formula (6) is also carried out in a manner known per se.

The resultant compounds of formula (1) can be isolated in a manner known per se, e.g. by salting them out.

The colourless cation M can likewise be introduced by known methods, for example via the dye acid, by ion pair extraction or by membrane technology.

The novel compounds of formula (1) are preferably used as dyes for dyeing and printing textile materials, paper, leather, and for the preparation of inks.

If the azo dyes of the present invention are used for dyeing and printing textile materials, then suitable materials are in particular those made of cotton. The novel dyes have good affinity for these textile materials, a good degree of exhaustion and good build-up. They give red dyeings of good fastness properties, in particular good wetfastness and lightfastness properties.

The preferred utility of the novel dyes of formula (1) is for dyeing and printing paper of all kinds, especially bleached and sized lignin-free paper.

The dyes of formula (1) exhaust well on to these substrates, and the wastewater—even when dyeing in deep shades (up to greater than $\frac{1}{1}$ standard depth dyeing)—remains almost colourless, which is an outstanding technical and environmental advantage. The good degree of exhaustion is also advantageous for a good reproducibility of shade. The dyeings are wetfast, i.e. they exhibit no tendency to bleeding when dyed paper in the wet state is brought into contact with moist white paper. This property is particularly desirable for tissues, of which it can be expected that the dyed paper in the wet state (e.g. impregnated with water, alcohol, surfactant solution and the like) will come into contact with other substrates such as textiles, paper and the like, which have to be protected against soiling. If desired, a cationic fixing agent can also be used when dyeing paper with the dyes of this invention.

The red dyeings are brilliant in shade and have very good fastness properties, especially lightfastness.

Further, the dyes of formula (1) are used for dyeing leather materials by a very wide range of application methods such as spraying, brushing and immersing, and for the preparation of inks of all kinds, such as for ball-point pens and printing inks.

The invention is illustrated by the following non-limitative Examples, in which parts and percentages are by weight.

EXAMPLE 1

To 6.9 parts of the phenyl carbamate of formula

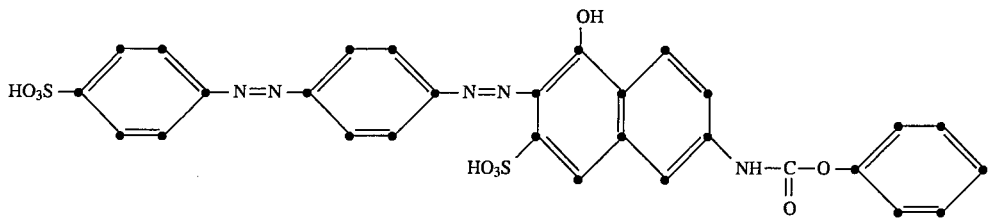

(obtained by acylating I-acid with phenyl chloroformate and coupling to diazotised 4-amino-1,1'-azobenzene-4'-sulfonic acid) in 50 parts of water are added 2 parts of metanilic acid. The reaction mixture is adjusted with sodium hydroxide solution to pH 7.5 and stirred at 60° C. until no more starting material can be detected by thin-layer chromatography. The resultant dye of formula (obtained by acylating I-acid with phenyl isocyanate in known manner) are charged to 500 parts of water and coupled with 27 parts of diazotised 4-amino-1,1'-azobenzene-4'-sulfonic acid at 0°–5° C. The pH is kept between 6 and 7 with 2N sodium hydroxode solution. The dye of formula

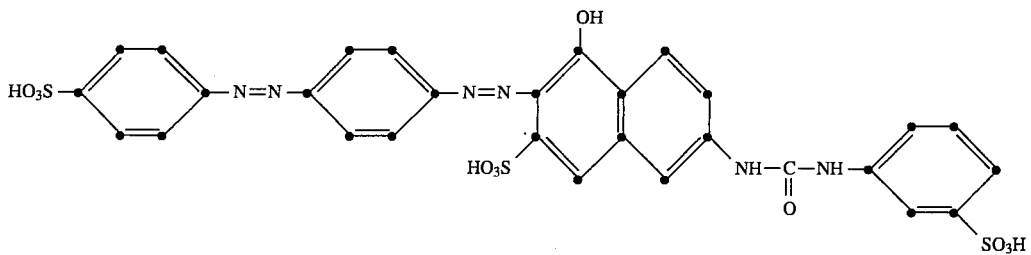

is isolated as sodium salt by salting out with NaCl. It dyes paper in brilliant bluish red shades. The tinctorial properties such as lightfastness, fastness to bleeding and affinity for paper, are excellent. The filter cake can be processed direct to liquid formulations.

The same dye with comparably good properties is obtained by replacing in this Example the 6.9 parts of phenyl carbamate by corresponding amounts of ethyl, isobutyl or benzyl carbamate and carrying out the process under the same reaction conditions.

EXAMPLE 2

40 parts of the urea compound of formula

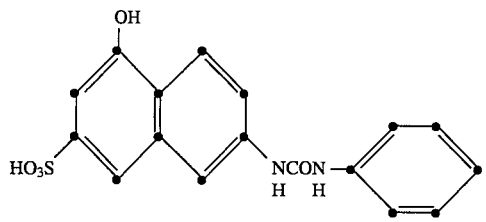

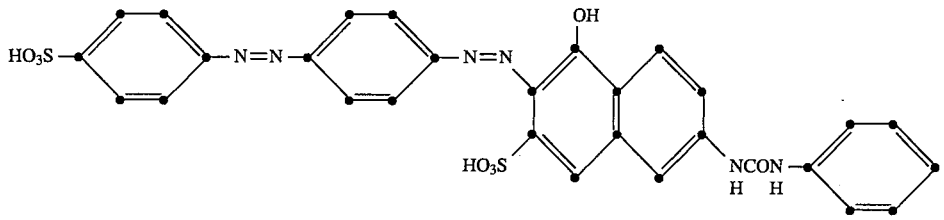

is then salted out with NaCl. It dyes paper in shades similar to those obtained with the dye described in Example 1.

EXAMPLES 3–59

The dyes listed in the following Table are obtained by procedures analogous to those described in the foregoing Examples.

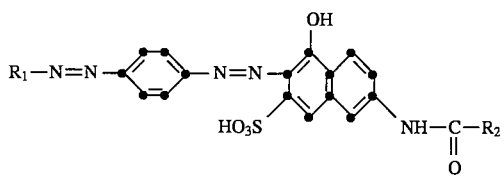

TABLE

| Ex. | $R_1$ | $R_2$ | Shade on paper |
|---|---|---|---|
| 3 | 4-HO₃S-C₆H₄- | -NH-C₆H₄-(2-SO₃H) | bluish red |
| 4 | 3-HO₃S-C₆H₄- | -NH-C₆H₄-(3-SO₃H) | bluish red |
| 5 | 4-HO₃S-C₆H₄- | -NH-C₆H₄-4-SO₃H | bluish red |
| 6 | 3-HO₃S-C₆H₄- | -NH-C₆H₄-4-SO₃H | bluish red |
| 7 | 2,4-(HO₃S)₂-C₆H₃- | -NH-C₆H₅ | bluish red |
| 8 | 4-HO₃S-C₆H₄- | -NH-C₆H₄-(2-CO₂H) | bluish red |
| 9 | 4-HO₃S-C₆H₄- | -NH-C₆H₄-(3-CO₂H) | bluish red |
| 10 | 4-HO₃S-C₆H₄- | -NH-C₆H₄-4-CO₂H | bluish red |
| 11 | 4-HO₃S-C₆H₄- | -NH-C₆H₃-(2,4-(SO₃H)₂) | bluish red |
| 12 | 4-HO₃S-C₆H₄- | -N(CH₃)-C₆H₅ | bluish red |

TABLE-continued

| Ex. | R₁ | R₂ | Shade on paper |
|---|---|---|---|
| 13 | HO₃S–C₆H₄– | –N(C₂H₅)–C₆H₅ | bluish red |
| 14 | HO₃S–C₆H₄– | –N(CH₂CH₂OH)–C₆H₅ | bluish red |
| 15 | HO₃S–C₆H₄– | –N(CH₃)–C₆H₄–SO₃H | bluish red |
| 16 | HO₃S–C₆H₄– | –N(C₂H₅)–C₆H₄–SO₃H | bluish red |
| 17 | HO₃S–C₆H₄– | –N(CH₂CH₂OH)–C₆H₄–SO₃H | bluish red |
| 18 | HO₃S–C₆H₄– | –NH–C₆H₃(SO₃H)(CH₃) | bluish red |
| 19 | HO₃S–C₆H₄– | –NH–C₆H₃(SO₃H)(CH₃) | bluish red |
| 20 | HO₃S–C₆H₄– | –NH–C₆H₃(CH₃)(SO₃H) | bluish red |
| 21 | HO₃S–C₆H₄– | –NH–C₆H₂(OCH₃)(SO₃H)(CH₃) | bluish red |
| 22 | HO₃S–C₆H₄– | –NH–C₆H₂(OCH₃)(SO₃H) | bluish red |

TABLE-continued

| Ex. | R₁ | R₂ | Shade on paper |
|---|---|---|---|
| 23 | HO₃S—C₆H₄— | —NH—C₆H₃(SO₃H)—OC₂H₅ | bluish red |
| 24 | HO₃S—C₆H₄— | —NH—C₆H₄—Cl | bluish red |
| 25 | HO₃S—C₆H₄— | —NH—C₆H₃(SO₃H)—Cl | bluish red |
| 26 | HO₃S—C₆H₄— | —NH—C₆H₄—CO₂C₂H₅ | bluish red |
| 27 | HO₃S—C₆H₄— | —NH—C₆H₄—CO₂CH₂CH₂OH | bluish red |
| 28 | HO₃S—C₆H₄— | —NH—C₆H₃(CO₂CH₂CH₂OH)—CO₂CH₂CH₂OH | bluish red |
| 29 | HO₃S—C₆H₄— | —NH—naphthyl(SO₃H)(SO₃H) | bluish red |
| 30 | HO₃S—C₆H₄— | —NH—naphthyl—SO₃H | bluish red |
| 31 | HO₃S—C₆H₄— | —NH—CH₂—C₆H₄—SO₃H | red |

TABLE-continued

| Ex. | R₁ | R₂ | Shade on paper |
|---|---|---|---|
| 32 | 4-HO₃S-C₆H₄- | -NH-CH(CH₃)-CH₂CH₂-C₆H₄-SO₃H (with HO₃S on ring) | red |
| 33 | 4-HO₃S-C₆H₄- | -NH-CH₂CH₂OH | red |
| 34 | 4-HO₃S-C₆H₄- | -N(CH₂CH₂OH)₂ | red |
| 35 | 3-HO₃S-C₆H₄- | -N(CH₂CH₂OH)₂ | red |
| 36 | 4-HO₃S-C₆H₄- | -N(CH₂CH₂NH₂)₂ | red |
| 37 | 3-HO₃S-C₆H₄- | -N(CH₂CH₂NH₂)₂ | red |
| 38 | 4-HO₃S-C₆H₄- | -N(piperazino)-N-CH₂CH₂OH | red |
| 39 | 4-HO₃S-C₆H₄- | -N(piperazino)-N-CH₂CH₂NH₂ | red |
| 40 | 4-HO₃S-C₆H₄- | -NH-CH₂CH₂CH₂N(CH₃)₂ | red |
| 41 | 4-HO₃S-C₆H₄- | -NH-CH₂CH₂CH₂N(C₂H₅)₂ | red |
| 42 | 4-HO₃S-C₆H₄- | -N(piperidino) H | red |
| 43 | 4-HO₃S-C₆H₄- | -NH-CH₂CH₂OCH₂CH₂OH | red |

TABLE-continued

| Ex. | R₁ | R₂ | Shade on paper |
|---|---|---|---|
| 44 | 4-HO₃S-C₆H₄- | -NH-CH₃ | red |
| 45 | 4-HO₃S-C₆H₄- | -NH-C₂H₅ | red |
| 46 | 4-HO₃S-C₆H₄- | -NH-C₄H₉ | red |
| 47 | 4-HO₃S-C₆H₄- | -N(CH₃)₂ | red |
| 48 | 4-HO₃S-C₆H₄- | -N(C₂H₅)₂ | red |
| 49 | 4-HO₃S-2,6-(CH₃)₂-C₆H₂- | -NH-C₆H₄-SO₃H | bluish red |
| 50 | 4-HO₃S-2,6-(CH₃)₂-C₆H₂- | -NH-C₆H₅ | bluish red |
| 51 | 4-HO₃S-2-CH₃-C₆H₃- | -NH-C₆H₅ | bluish red |
| 52 | 4-HO₃S-2-CH₃-C₆H₃- | -NH-C₆H₄-SO₃H | bluish red |
| 53 | 4-HO₃S-3-CH₃-C₆H₃- | -NH-C₆H₄-SO₃H | bluish red |

TABLE-continued

| Ex. | R₁ | R₂ | Shade on paper |
|---|---|---|---|
| 54 | 4-methyl-2-sulfophenyl | —NH—phenyl | bluish red |
| 55 | 4-methyl-2-sulfophenyl (CH₃ at 4, SO₃H at 2) | —NH—phenyl | bluish red |
| 56 | 4-methyl-2-sulfophenyl | —NH—(4-sulfophenyl) | bluish red |
| 57 | 2-sulfophenyl | —NH—(4-sulfophenyl) | bluish red |
| 58 | 4-carboxyphenyl | —NH—(4-sulfophenyl) | bluish red |
| 59 | 3,4-dicarboxyphenyl | —NH—phenyl | bluish red |

EXAMPLE 60

200 parts of the dye of Example 2 are homogenised in the form of the free dye acid of low salt content by stirring in 500 parts of water and dissolved at 40° C. by addition of 58 parts of diethanolamine and 100 parts of urea. The solution is clarified by filtration by adding a filter aid. The filtrate is allowed to cool to room temperature and made up to 1000 parts with water, to give a stable dye solution which constitutes a liquid commercial form.

Instead of using diethanolamine it is also possible to use monoethanolamine, triethanolamine, 2-(2-aminoethoxy-)ethanol, the polyglycolamines disclosed in German Offenlegungsschrift 2 061 760, ammonia, tetramethylammonium hydroxide, lithium hydroxide or lithium carbonate.

EXAMPLE 61

70 parts of chemically bleached softwood sulfite pulp and 30 parts of chemically bleached birchwood sulfite pulp are beaten in 2000 parts of water in a hollander. To this pulp are added 2.5 parts of the dye solution described in Example 60. After mixing for 20 minutes, paper is prepared from this pulp. The absorbent paper so obtained is dyed red. The wastewater is almost colourless.

EXAMPLE 62

0.5 part of the dye powder of Example 1 is dissolved in 100 parts of hot water and the solution is cooled to room temperature. This solution is added to 100 parts of chemically bleached sulfite pulp which has been beaten in 2000 parts of water in a hollander. After mixing thoroughly for 15 minutes, sizing is effected in conventional manner with rosin size and aluminium sulfate. Paper prepared from this pulp is dyed in a red shade of good fastness properties.

EXAMPLE 63

69 g of the dyestuff sodium salt obtained in Example 2 are stirred in 600 ml of water and then 160 ml of nitrobenzene, 40.7 g of tributylamine and 22 ml of 32% HCl are added at 50° C. The batch is stirred at 70° C. until the dye has completely transferred to the organic phase. The aqueous phase is discarded and the organic phase is washed with 2×600 ml of hot water. Then 250 ml of water and 39.7 g of triethanolamine are added and the mixture is stirred at 85° C. until the dye has transferred completely to the aqueous phase. The aqueous phase is freed from traces of nitrobenzene and tributylamine by steam distillation, to give a stable dye solution. The organic phase is used as obtained for further extractions.

What is claimed is:

1. A disazo dye of the formula

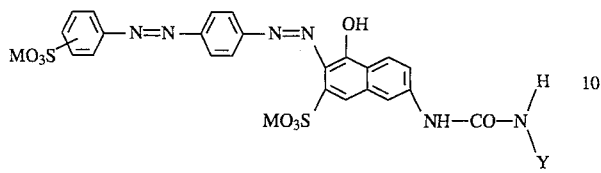

wherein

Y is unsubstituted phenyl and M is a colourless cation.

2. A disazo dye of the formula

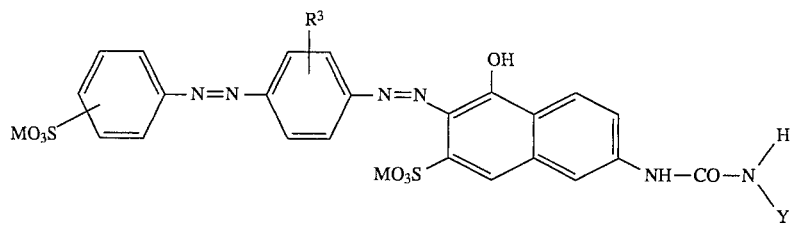

wherein $R^3$ is hydrogen or $C_1$-$C_4$ alkyl,

Y is unsubstituted phenyl or phenyl which is substituted by sulfo, $C_1$-$C_4$ alkyl, carboxy, Cl, $C_1$-$C_4$ alkoxy, ethoxycarbonyl or hydroxyethoxycarbonyl and M is a colourless cation.

3. A disazo dye of the formula

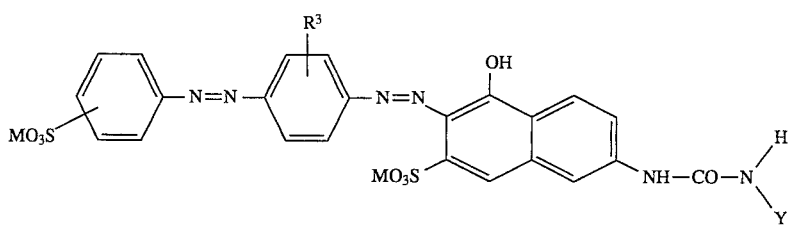

wherein $R^3$ is hydrogen or methyl,

Y is unsubstituted phenyl or phenyl which is substituted by sulfo, $C_1$-$C_4$ alkyl, carboxy, Cl, $C_1$-$C_4$ alkoxy, ethoxycarbonyl or hydroxyethoxycarbonyl and M is a colourless cation.

4. A disazo dye of the formula

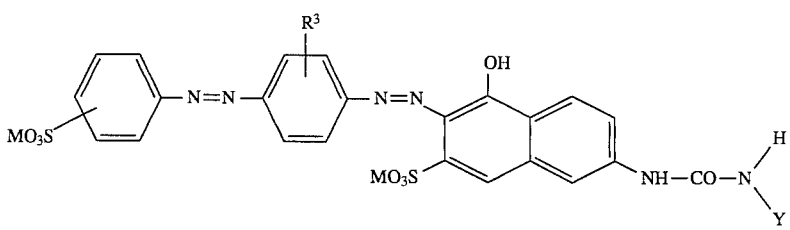

wherein $R^3$ is hydrogen or $C_1$-$C_4$ alkyl,

Y is unsubstituted phenyl and

M is a colourless cation.

5. A disazo dye of the formula

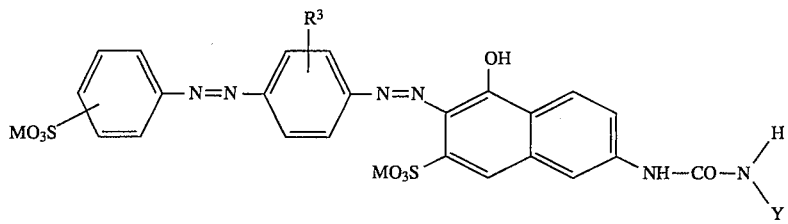
wherein
 $R^3$ is hydrogen or methyl,
 Y is unsubstituted phenyl and
 M is a colourless cation.
* * * * *